United States Patent
Yamazaki

(10) Patent No.: US 8,547,815 B2
(45) Date of Patent: Oct. 1, 2013

(54) OPTICAL PICKUP DEVICE AND OPTICAL DISC APPARATUS

(75) Inventor: Kazuyoshi Yamazaki, Kawasaki (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/548,375

(22) Filed: Jul. 13, 2012

(65) Prior Publication Data

US 2013/0016599 A1 Jan. 17, 2013

Related U.S. Application Data

(63) Continuation of application No. 12/354,021, filed on Jan. 15, 2009, now Pat. No. 8,223,613.

(30) Foreign Application Priority Data

Jan. 21, 2008 (JP) ................................. 2008-009984

(51) Int. Cl.
*G11B 7/135* (2012.01)

(52) U.S. Cl.
USPC .............. 369/112.07; 369/44.41; 369/112.03

(58) Field of Classification Search
None
See application file for complete search history.

(56) References Cited

U.S. PATENT DOCUMENTS

| 6,185,167 | B1 | 2/2001 | Arai et al. |
| 7,227,819 | B2 | 6/2007 | Kadowaki et al. |
| 8,040,780 | B2 * | 10/2011 | Yamazaki et al. ....... 369/112.07 |
| 8,223,613 | B2 * | 7/2012 | Yamazaki ................ 369/112.07 |
| 8,295,144 | B2 * | 10/2012 | Yamazaki et al. ....... 369/112.07 |
| 2003/0053211 | A1 | 3/2003 | Takasuka et al. |
| 2006/0187778 | A1 | 8/2006 | Kaji et al. |
| 2007/0206451 | A1 | 9/2007 | Kobayashi et al. |
| 2008/0094976 | A1 | 4/2008 | Kamisada et al. |
| 2009/0028035 | A1 | 1/2009 | Sano et al. |
| 2009/0028036 | A1 | 1/2009 | Nishiwaki et al. |
| 2009/0278029 | A1 | 11/2009 | Ogasawara et al. |

FOREIGN PATENT DOCUMENTS

| JP | 11-073658 | 3/1999 |
| JP | 2000-215490 | 8/2000 |
| JP | 2000-215491 | 8/2000 |
| JP | 2005-108331 | 4/2005 |

(Continued)

OTHER PUBLICATIONS

Kousei Sano et al., "Novel One-Beam Tracking Detection Method for Dual-Layer Blu-ray Discs", IEICE Technical Report, CPM, Oct. 14, 2005, vol. 105, No. 360, pp. 31-34.

*Primary Examiner* — Luxi X Simpson
(74) *Attorney, Agent, or Firm* — Antonelli, Terry, Stout & Kraus, LLP.

(57) ABSTRACT

Optical pickup device including: semiconductor laser diode emitting optical flux; objective lens converging flux emitted from the diode and radiating flux to an optical disc; diffraction grating branching an optical flux reflected from the disc; and a photodetector receiving flux branched by the grating and has a plurality of light receiving parts, wherein: the grating has areas A, B and C; among diffracted beams diffracted by a track of the optical disc, only a 0-th order diffracted beam becomes incident upon area A, and 0-th and ±1-st order diffracted beams become incident upon area B; the photodetector detects a reproduction signal from optical fluxes diffracted in areas A, B and C; the plurality of light receiving parts which detect the +1-st order diffracted beam or the −1-st diffracted beam diffracted in area A are aligned in a direction substantially perpendicular or parallel to a track direction of the disc.

14 Claims, 16 Drawing Sheets

(56) References Cited

FOREIGN PATENT DOCUMENTS

| | | |
|---|---|---|
| JP | 2006-139872 | 6/2006 |
| JP | 2006-338754 | 12/2006 |
| JP | 2006-344344 | 12/2006 |
| JP | 2006-344380 | 12/2006 |
| WO | WO 2006/118082 | 11/2006 |
| WO | WO 2007/105704 | 9/2007 |
| WO | WO 2008/053548 | 5/2008 |

* cited by examiner

BEAM MOTION DIRECTION BY DEFOCUSING

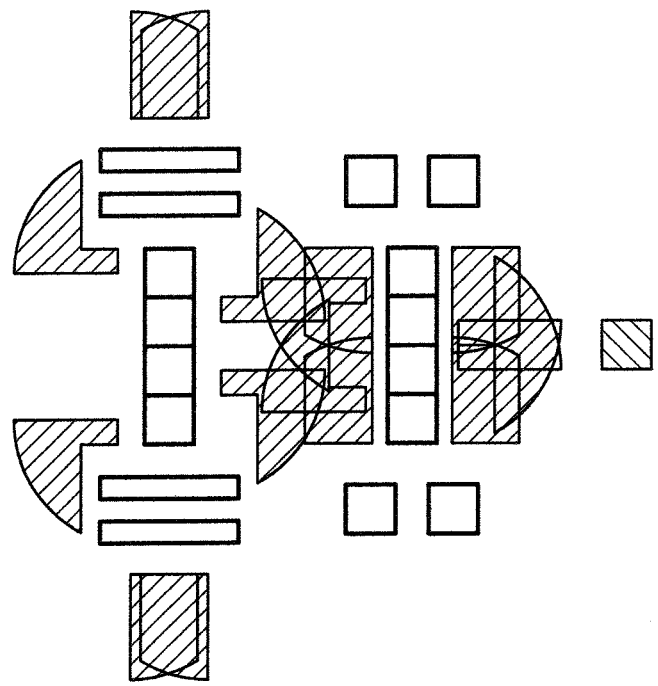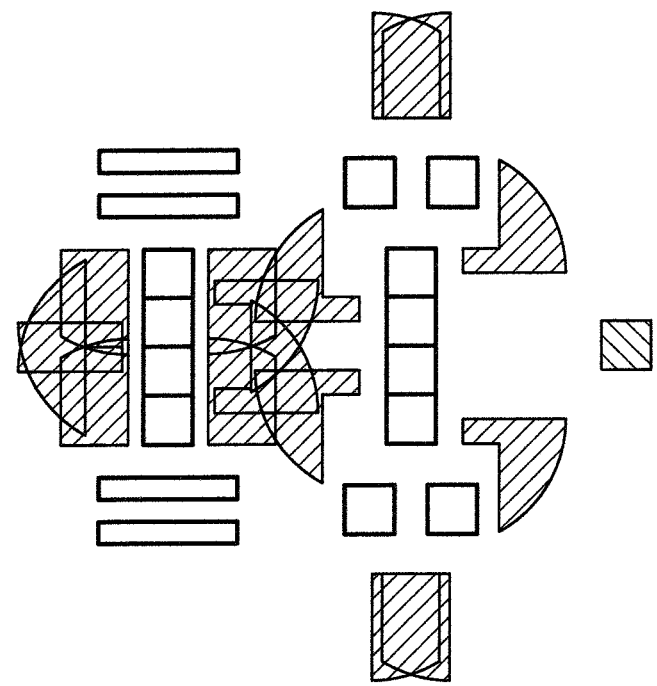

FIG.12
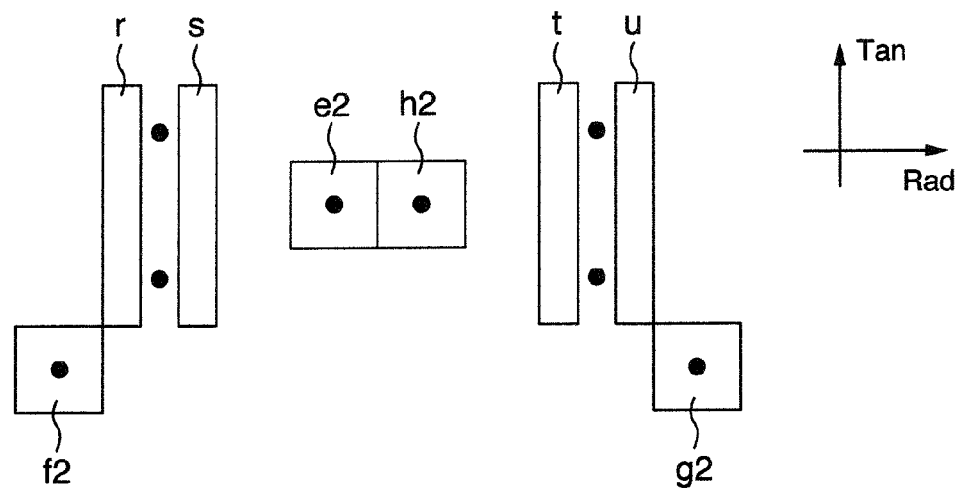
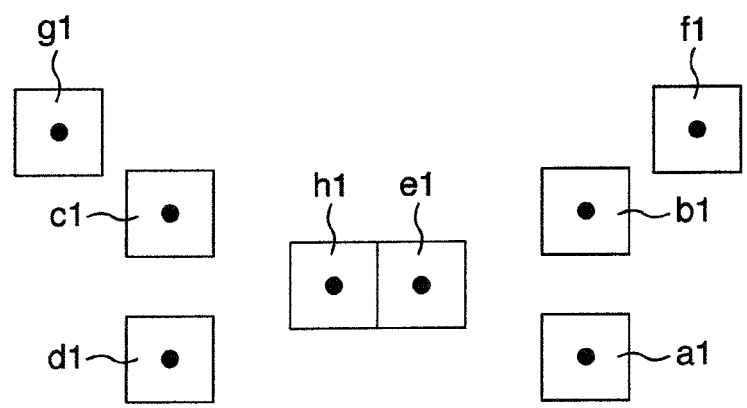
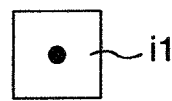

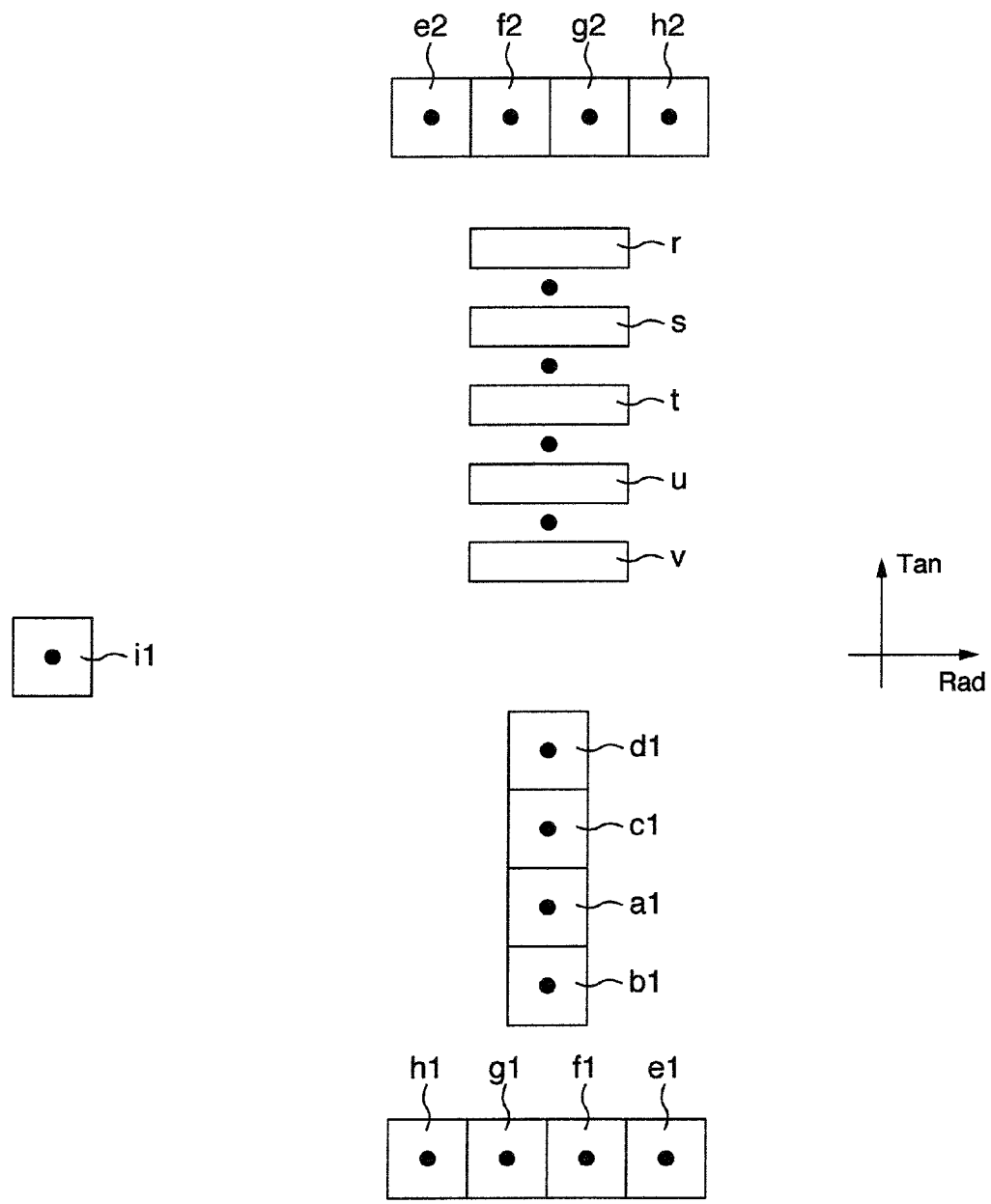

46

FIG.15A
FIG.15B
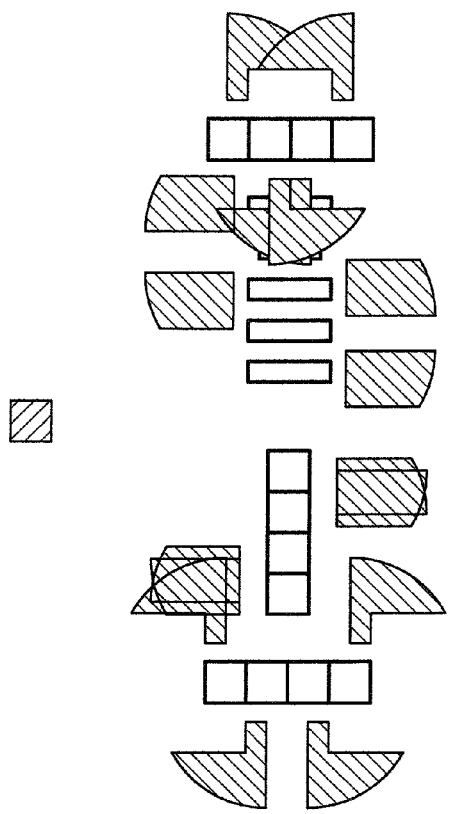
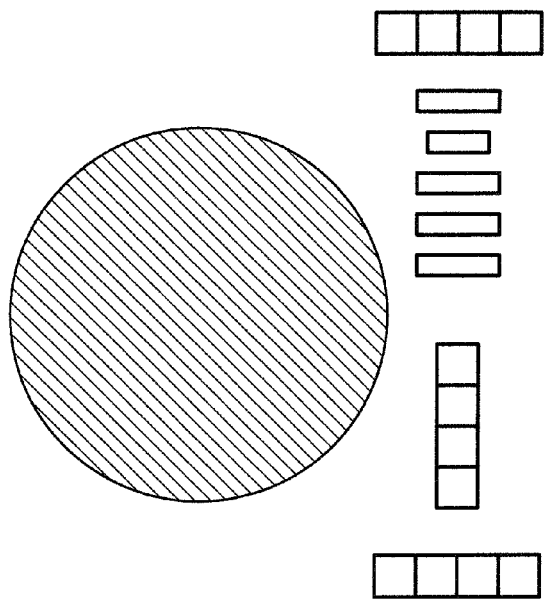

OPTICAL PICKUP DEVICE AND OPTICAL DISC APPARATUS

CROSS REFERENCE TO RELATED APPLICATION

This is a continuation of U.S. application Ser. No. 12/354,021, filed Jan. 15, 2009 now U.S. Pat. No. 8,223,613. This application relates to and claims priority from Japanese Patent Application No. 2008-009984, filed on Jan. 21, 2008. The entirety of the contents and subject matter of all of the above is incorporated herein by reference.

BACKGROUND OF THE INVENTION

The present invention relates to an optical pickup device and an optical disc apparatus.

As a background art in this technical field, there is, for example, JP-A-2006-344344. This publication describes that "a desired signal is acquired at high precision from an optical disc having a plurality of recording layers". There is also, for example, JP-A-2006-344380. This publication describes that "even if a writable optical storage medium having two information recording planes is used, a tracking signal having a small offset is detected" Further, for example, Technical Report of IEICE, CPM2005-149 (2005-10, p. 33, FIGS. 4 and 5) describes that "a tracking photodetector is disposed in an area where there is no stray light.

SUMMARY OF THE INVENTION

JP-A-2006-344344 adopts a structure that an optical beam reflected from an optical disc is narrowed by a focusing lens and transmitted through two quarter wavelength plates and a polarizing device, and the broadened light is narrowed by a focusing lens to be radiated to a detector. There is, therefore, a concern that an optical detection system is complicated and its size becomes large. According to JP-A-2006-344380, a diffraction grating for forming three spots is disposed ahead of a laser light source, and one main spot and two sub-spots are radiated on a disc. There is, therefore, a concern that an optical efficiency of the main beam necessary for recording lowers.

Technical Report of IEICE, CPM2005-149 (2005-10), p33 describes a structure that a tracking photodetector is disposed outside stray light from another layer of a focusing optical beam generated around a focusing photodetector, and that light diffracted in the central area of a hologram device is flown outside stray light from the other layer. There is therefore a fear that the size of the photodetector becomes large.

It is an object of the present invention to provide an optical pickup device capable of obtaining stable servo signals for recording/reproducing by an information recording medium having a plurality of information recording layers, and an optical disc apparatus mounting the optical pickup device of this type.

The above-described object can be achieved by the inventions described in the appended claims.

According to the present invention it becomes possible to provide an optical pickup device capable of obtaining stable servo signals for recording/reproducing by an information recording medium having a plurality of information recording parts, and an optical disc apparatus mounting the optical pickup device of this type.

These and other features, objects and advantages of the present invention will become more apparent from the following description when taken in conjunction with the accompanying drawings.

BRIEF DESCRIPTION OF THE DRAWINGS

FIGS. 11A and 11B are diagrams showing the shapes of stray light by a dual layer disc according to the second embodiment.

FIG. 12 is a diagram showing another light receiving part according to the second embodiment of the present invention.

FIG. 13 is a diagram showing a light receiving part according to a third embodiment of the present invention.

FIGS. 15A and 15B are diagrams showing the shapes of stray light by a dual layer disc according to the first embodiment.

DETAILED DESCRIPTION OF THE EMBODIMENTS

Embodiments of the present invention will be described hereunder.

[First Embodiment]

Figure 1:
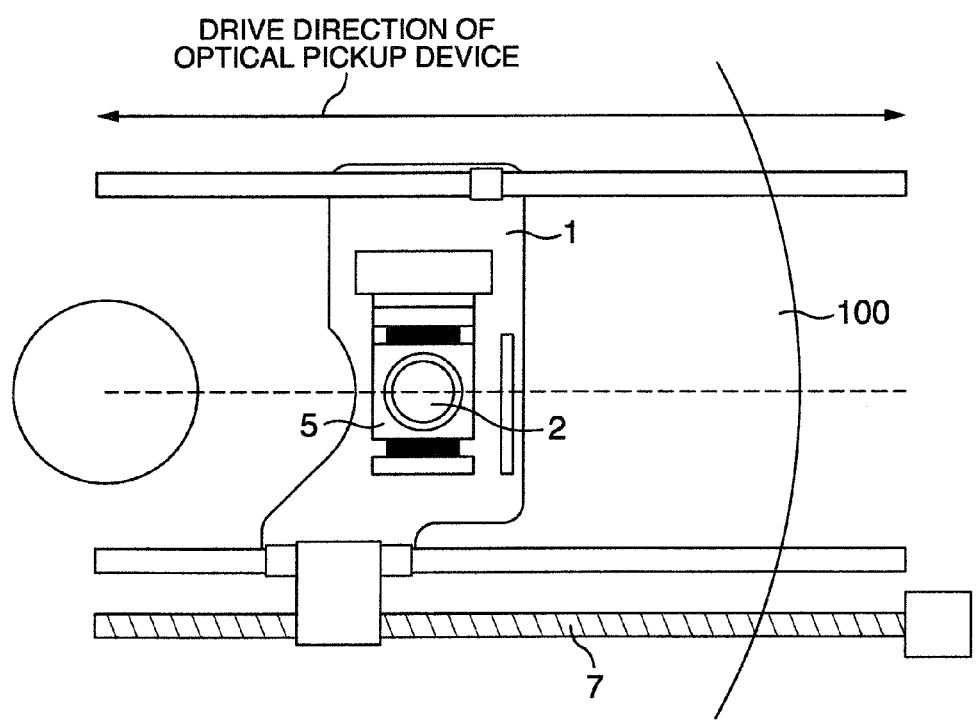
FIG. 1 is a diagram illustrating the arrangement of an optical pickup device and an optical disc according a first embodiment.

FIG. 1 shows an example of an optical pickup device according to the first embodiment of the present invention.

An optical pickup device 1 is structured in such a manner that the device can be driven in a Rad direction (see FIG. 3) of an optical disc 100 by a drive mechanism 7 shown in FIG. 1. An objective lens 2 is mounted on an actuator 5 of the optical pickup device, and radiates light to the optical disc. Light emitted from the objective lens 2 forms a spot on the optical disc 100 and is reflected from the optical disc 100. By detecting this reflected light, a focusing error signal and a tracking error signal are generated.

Figure 2:
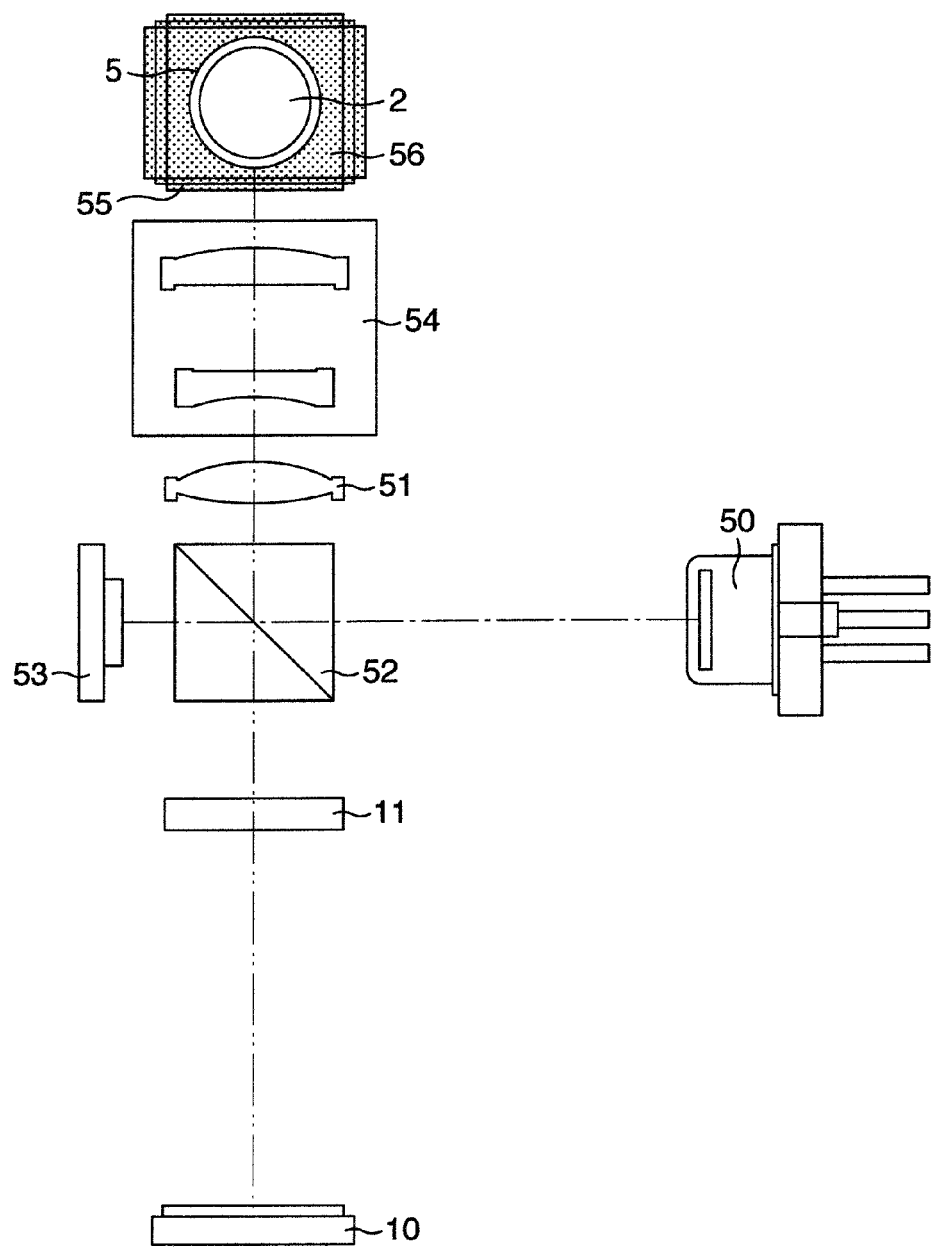
FIG. 2 is a diagram illustrating an optical system according to the first embodiment of the present invention.

FIG. 2 shows an optical system of the optical pickup device described above. Although BD (Blu-ray Disc) will be described, other recording methods may also be used including HD (High Definition) DVD.

An optical beam having a wavelength of about 405 nm is emitted as radiation light from a semiconductor laser diode 50. The optical beam emitted from the semiconductor laser diode 50 is reflected by a beam splitter 52. A portion of the optical beam transmits through the beam splitter 52 and becomes incident upon a front monitor 53. In recording information in a writable type optical disc such as BD-RE (Blu-ray Disc Rewritable) and BD-R (Blu-ray Disc Recordable), it is generally required to control a light amount of semiconductor laser diode at high precision. To this end, while a signal is recorded in a writable type optical disc, the front monitor 53 detects a change in the light amount of the semiconductor laser diode 50 and feeds this change back to a drive circuit (not shown) of the semiconductor laser diode 50. In this manner, it becomes possible to monitor the light amount on an optical disc.

The optical beam reflected at the beam splitter 52 is converted into a generally parallel optical beam by a collimating lens 51. The optical beam transmitted through the collimating lens 51 becomes incident upon a beam expander 54. The beam expander 54 is used for compensating a spherical aberration caused by a thickness error of a cover layer of the optical disc 100, by changing a divergence/convergence state of the optical beam. The optical beam emitted from the beam expander 54 is reflected by a reflection mirror 55, transmitted through a quarter wavelength plate 56, and thereafter converged upon the optical disc 100 by the objective lens 2 mounted on the actuator 5.

The optical beam reflected at the optical disc 100 transmits through the objective lens 2, quarter wavelength plate 56, reflection mirror 55, beam expander 54 collimating lens 51 and beam splitter 52, and becomes incident upon a diffraction grating 11. A light flux of the optical beam is divided into a plurality of areas by the diffraction grating 11, and each light flux propagates along a direction different for each area and is focused upon a photodetector 10. A plurality of light receiving parts are formed on the photodetector 10, and each light flux divided by the diffraction grating 11 is radiated to each light receiving part. The photodetector 10 outputs electrical signals each corresponding to the light amount received in each light receiving part, and these electrical signals are processed to generate an RF signal as a reproduction signal, and a focusing error signal and a tracking error signal.

Figure 3:
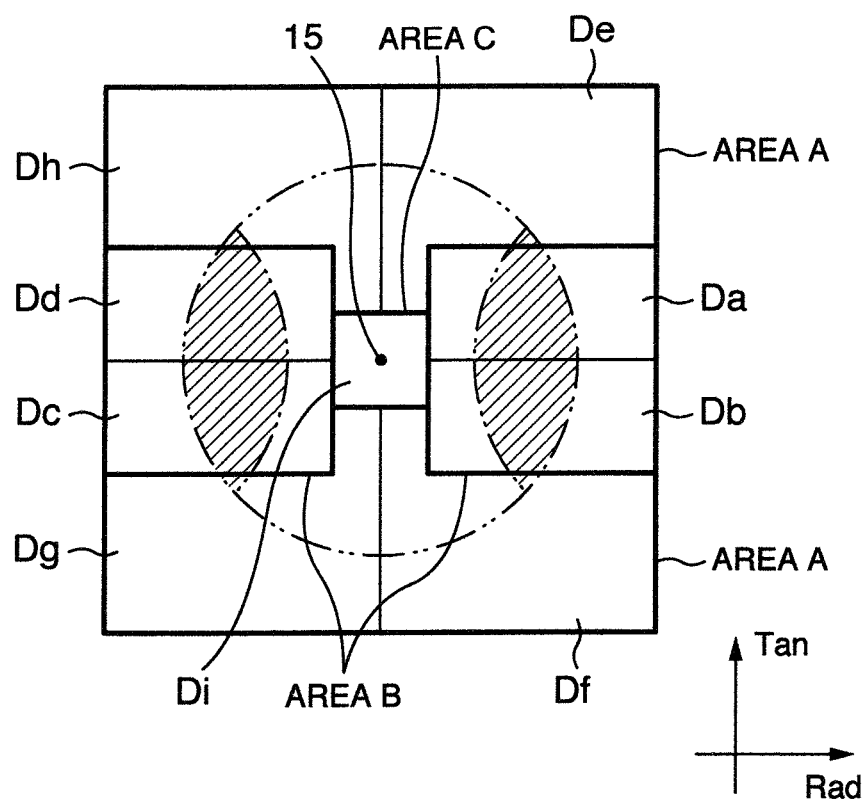
FIG. 3 is a diagram showing a diffraction grating according to the first embodiment of the present invention.

The diffraction grating 11 shown in FIG. 2 has a pattern such as shown in FIG. 3. A solid line indicates a border of each area, a two-dot chain line indicates a circumferential shape of a light flux of the laser beam, and hatched areas indicate a push-pull pattern formed by a track of the optical disc. Referring to FIG. 3, an area A is constituted of areas De, Df, Dg and Dh, an area B is constituted of areas Da, Db, Dc and Dd, and an area C is constituted of an area Di. The areas A and B are line symmetrical relative to a center axis, and also line symmetrical relative to an axis perpendicular to the center axis. As shown in FIG. 3, the center axis is an axis passing the center of the area Di and being parallel to a Tan direction. A spectral ratio of the area of the diffraction grating 11 other than the Di area is, for example, (0-th order light): (+1-st order light): (−1-st order light)=0:7:3, and a spectral ratio of the area Di is, (0-th order light): (+1-st order light): (−1-st order light)=0:1: 0. The photodetector 10 has a pattern such as shown in FIG. 4.

Figure 4:
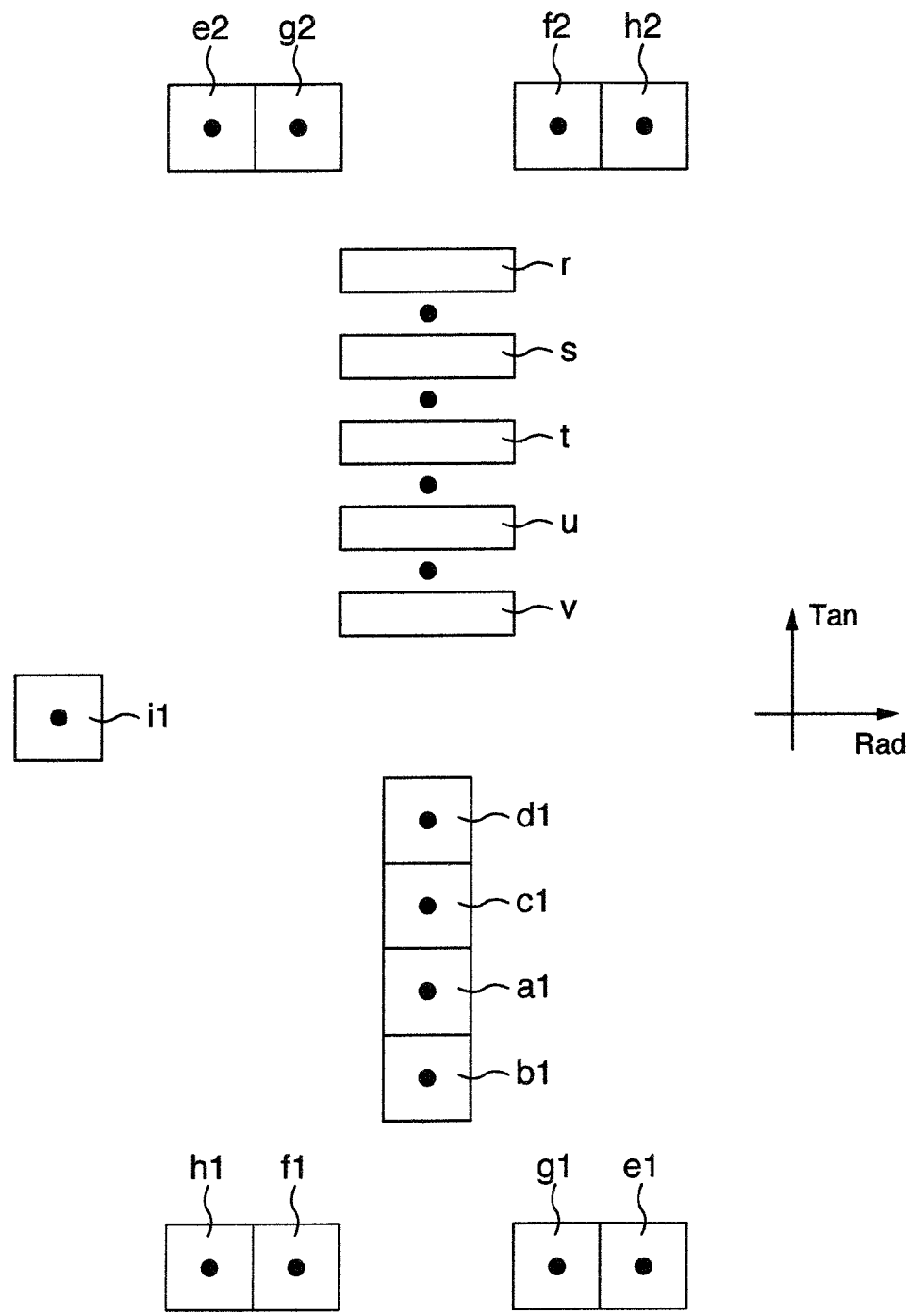
FIG. 4 is a diagram showing a light receiving part according to the first embodiment of the present invention.

In this pattern, +1-st order optical beams diffracted in the areas Da, Db, Dc, Dd, De, Df, Dg, Dh and Di of the diffraction grating 11 become incident upon light receiving parts a1, b1, c1, d1, e1, f1, g1, h1 and i1 of the photodetector shown in FIGS. 4, and −1-st order optical beams become incident upon light receiving parts r, s, t, u, y, v, e2, f2, g2 and h2.

Signals A1, B1, C1, D1, E1, F1, G1, H1, I1, R, S, T, U, V, E2, H2, F2, G2 and H2 obtained from the light receiving parts a1, b1, c1, d1, e1, f1, g1, h1, i1, r, s, t, u, v, e2, f2, g2 and h2 are calculated by the following equations to generate a focusing error signal (FES), a tracking error signal (TES) and an RF signal.

$FES=(R+T+V)-(S+U)$ $TES=[(A1+B1+E1+F1)-(C1+D1+G1+H1)]-kt\times[(E2+F2)-(G2+H2)]$ $RF=A1+B1+C1+D1+E1+F1+G1+H1+I1+E2+F2+G2+H2$      Equations 1

Here kt is a coefficient for not making a tracking error signal generate DC components when the objective lens displaces. Its focusing error detection method is the knife edge method which is publicly known and the description thereof is omitted.

Figure 5A:
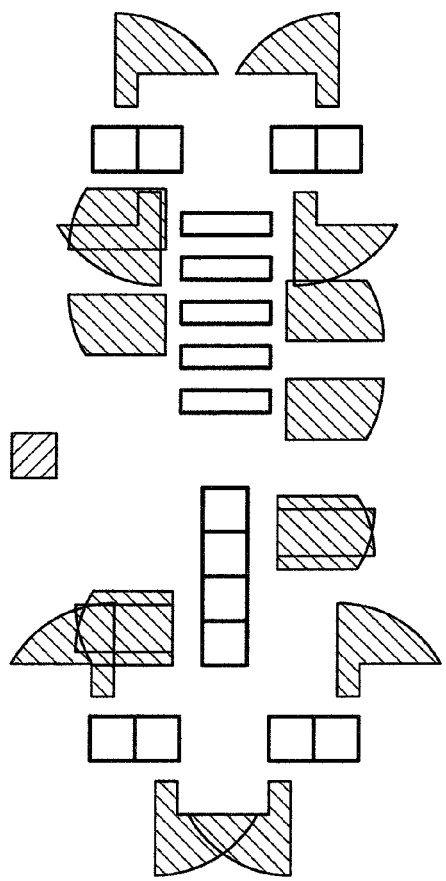
FIGS. 5A and 5B are diagrams showing the shapes of stray light by a dual layer disc according to the first embodiment.
Figure 5B:
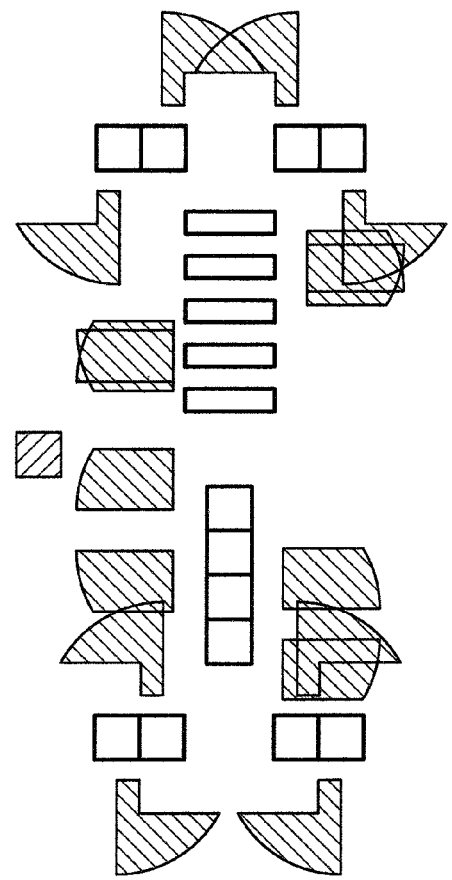

FIGS. 5A and 5B show relationships between signal beams and stray light from other layers during recording/reproducing a dual layer disc. FIG. 5A shows the recording/reproducing of a layer 0, and FIG. 5B shows the recording/reproducing of a layer 1. For optical beams other than an optical beam diffracted in the Di area of the diffraction grating 11, it can be understood that a signal beam and stray light from another layer are not superposed on the light receiving part. A signal I1 detected at the light receiving part i1 is not used for detecting a tracking error signal, and is used only for detecting a reproduction signal. Therefore, even if there is stray light, there is no practical problem.

In actual signal detection, recording/reproducing is performed while the objective lens follows a track on the disc. Therefore, the objective lens displaces along the radial direction (hereinafter called Rad direction). As the objective lens displaces, only stray components displace on the photodetector. Therefore, as the objective lens displaces, there is a possibility that stray light from another layer becomes incident upon a light receiving part of a photodetector if it has a useful light receiving pattern. In contrast, the present invention increases a displacement allowance amount of the objective lens, by optimizing the photodetector 10 relative to the pattern of the diffraction grating 11. It is required to consider how a signal beam and stray light are separated relative to a lens displacement direction. This point will be described hereunder.

Figures 6A, 6B, 6C:
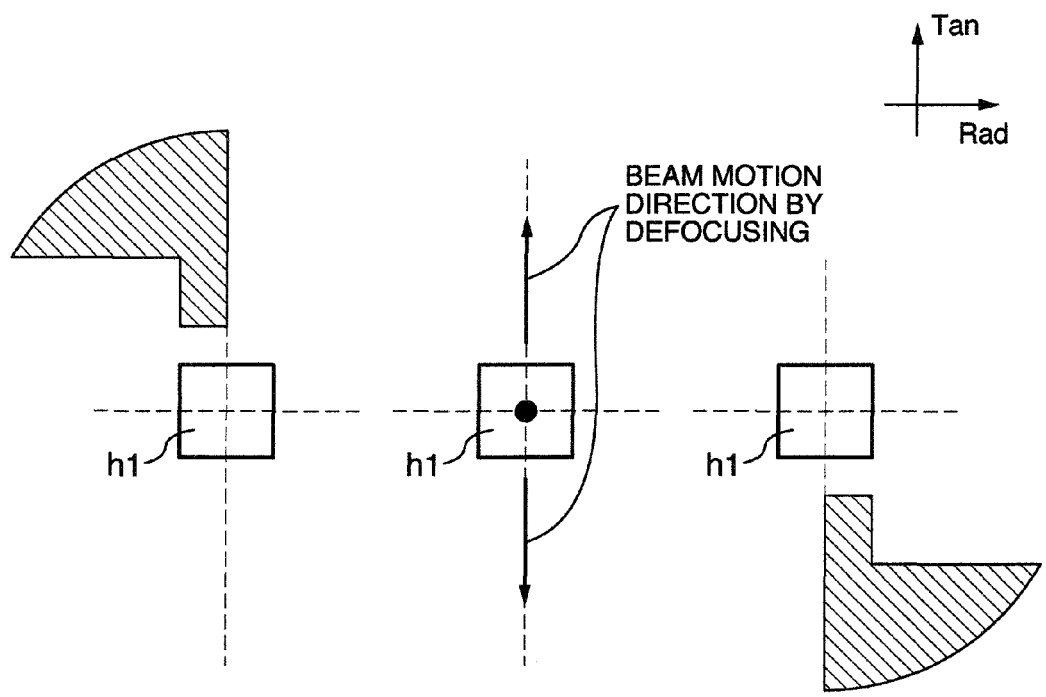
FIGS. 6A to 6C are diagrams showing the behavior of stray light from one layer among two layers.
Figure 7A:
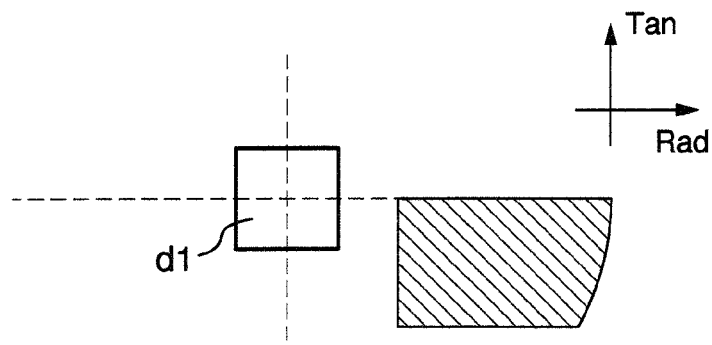
FIGS. 7A to 7C are diagrams showing the behavior of stray light from one layer among two layers.
Figure 7B:
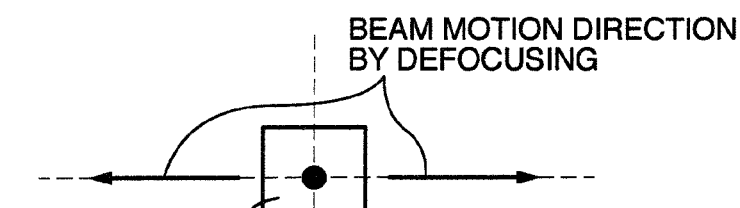
Figure 7C:
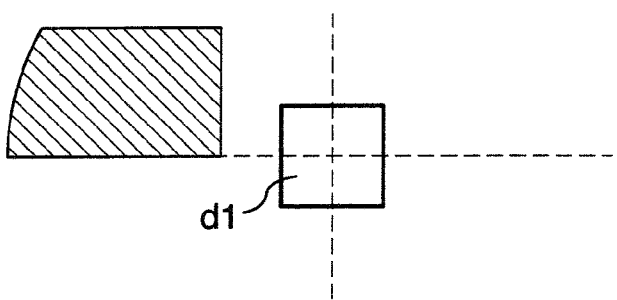

FIGS. 6A to 6C show an optical beam diffracted in the diffraction grating area Dh and becomes incident upon the light receiving part h1. FIGS. 7A to 7C show an optical beam diffracted in the diffraction grating area Dd and becomes incident upon the light receiving part d1. FIGS. 6A, 6B and 6C are classified in accordance with a state of an optical spot of the disc, FIG. 6B shows a state that the optical spot is in-focus on the disc, and FIGS. 6A and 6C show a defocus state. The relationships shown in FIGS. 6A, 6B and 6C are not dependent on the position of the light receiving part. The reason why defocus is explained here is that stray light can be interpreted as defocus light reflected at the position other than the focus position.

It can be understood from comparison between FIGS. 6A to 6C and FIGS. 7A to 7C that a motion direction by defocus changes. An optical beam diffracted in Dh shown in FIGS. 6A to 6C moves along a track direction of the disc (hereinafter called Tan direction) due to defocus. In contrast, an optical beam diffracted in Dd shown in FIGS. 7A to 7C moves along the Rad direction. The motion direction due to defocus becomes different because the optical beam defocuses in point symmetry relative to the optical beam center 15 on the diffraction grading. It is important from this reason that a stray light averting method is changed depending upon the light receiving part.

If the diffraction grating areas are spaced in the Tan direction relative to the optical beam center 15 (in this case, areas Dh, De, Df and Dg), it is desired to avert stray light in the Tan direction. By averting stray light in this manner, even if the objective lens displaces in the Rad direction, stray light will not enter the photodetector. By aligning the light receiving parts for detecting optical beams diffracted in the diffraction grating areas Dh, De, Df and Dg, along the Rad direction, it becomes possible to minimize the influence of stray light diffracted in other areas.

If diffraction grating areas are spaced in the Rad direction relative to the optical beam center 15 (in this case, areas Da, Db, Dc and Dd), it is desired to skip stray light in the Rad direction. Accordingly, by aligning the light receiving parts for detecting optical beams diffracted in the diffraction grating areas Da, Db, Dc and Dd, along the Tan direction, it becomes possible to minimize the influence of stray light diffracted in other areas and to make the photodetector compact. If the light beams diffracted in the diffraction grating areas Da, Db, Dc and Dd are aligned along the Rad direction, there arises a problem that when the objective lens is displaced in the Rad direction, stray light becomes incident upon the light receiving part.

Figure 8:
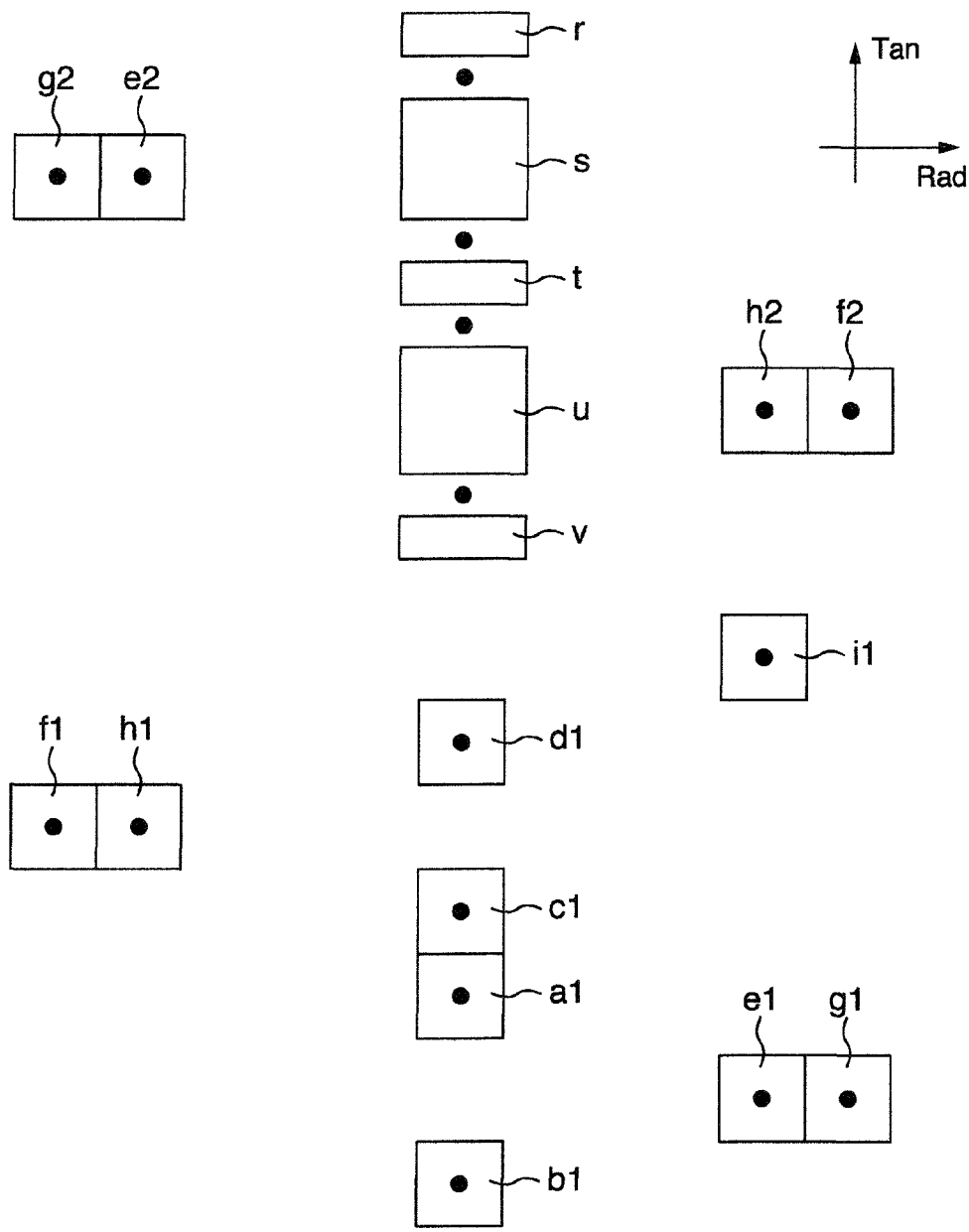
FIG. 8 is a diagram showing another light receiving part according to the first embodiment of the present invention.
Figure 9A:
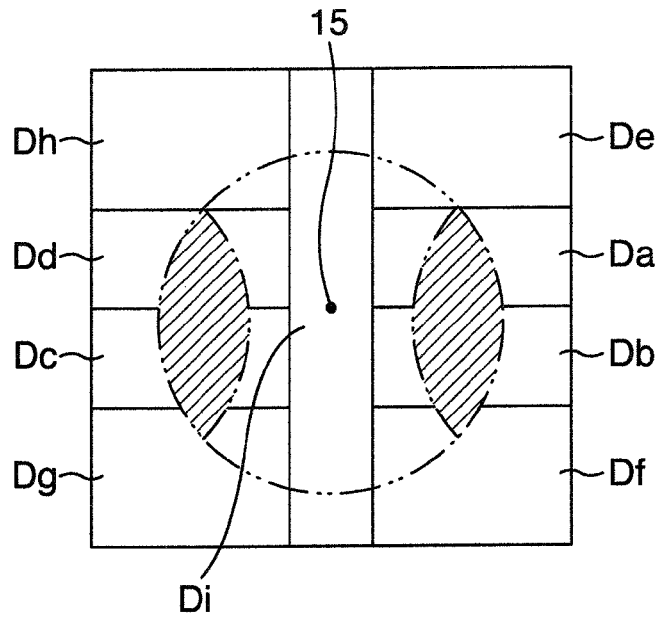
FIGS. 9A and 9B are diagrams showing other diffraction gratings according to the first embodiment of the present invention.
Figure 9B:
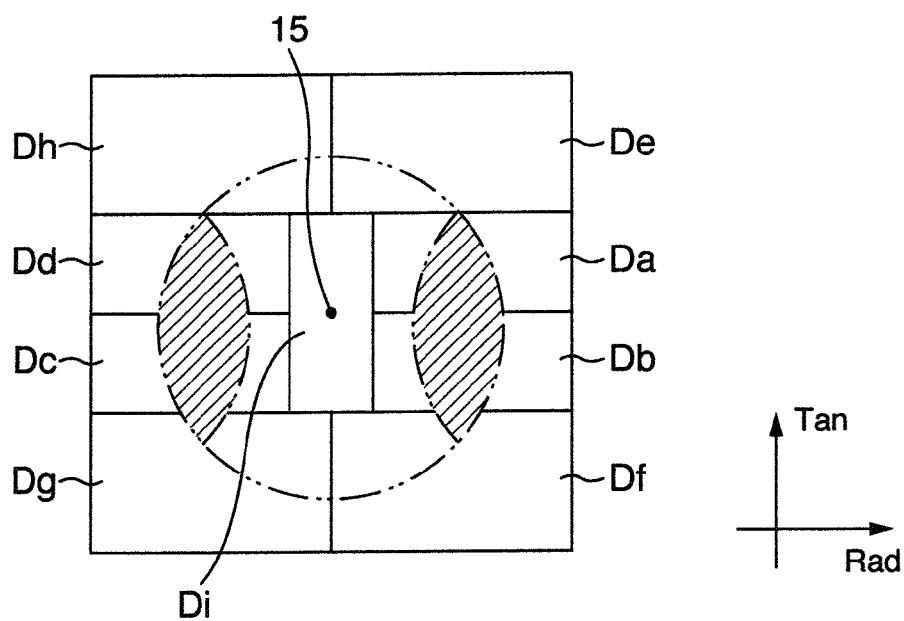

As described above, by making the photodetector 10 to have the pattern such as shown in FIG. 4, it becomes possible to separate effectively a signal beam and stray light and make compact the photodetector. Although the light receiving parts a1, b1, c1 and d1 are disposed in the Rad direction in a straight line and e1, f1, g1, h1 and e2, f2, g2, h2 are disposed in the Rad direction in a straight line, it is needless to say that similar effects can be obtained if two or more light receiving parts are disposed side by side in the Tan or Rad direction as shown in FIG. 8 even if the light receiving parts are not disposed in the Tan or Rad direction in a straight line. The diffraction grating 11 may have the patterns such as shown in FIGS. 9A and 9B. Further in this embodiment, although the diffraction grating is disposed such that transmission through the beam splitter occurs before, it may be disposed such that transmission through the beam splitter after, by using a polarized diffraction grating as the diffraction grating 11. Although a dual layer optical disc is used in the description, an optical disc having more layers may also be used.

[Second Embodiment]

Figure 10:
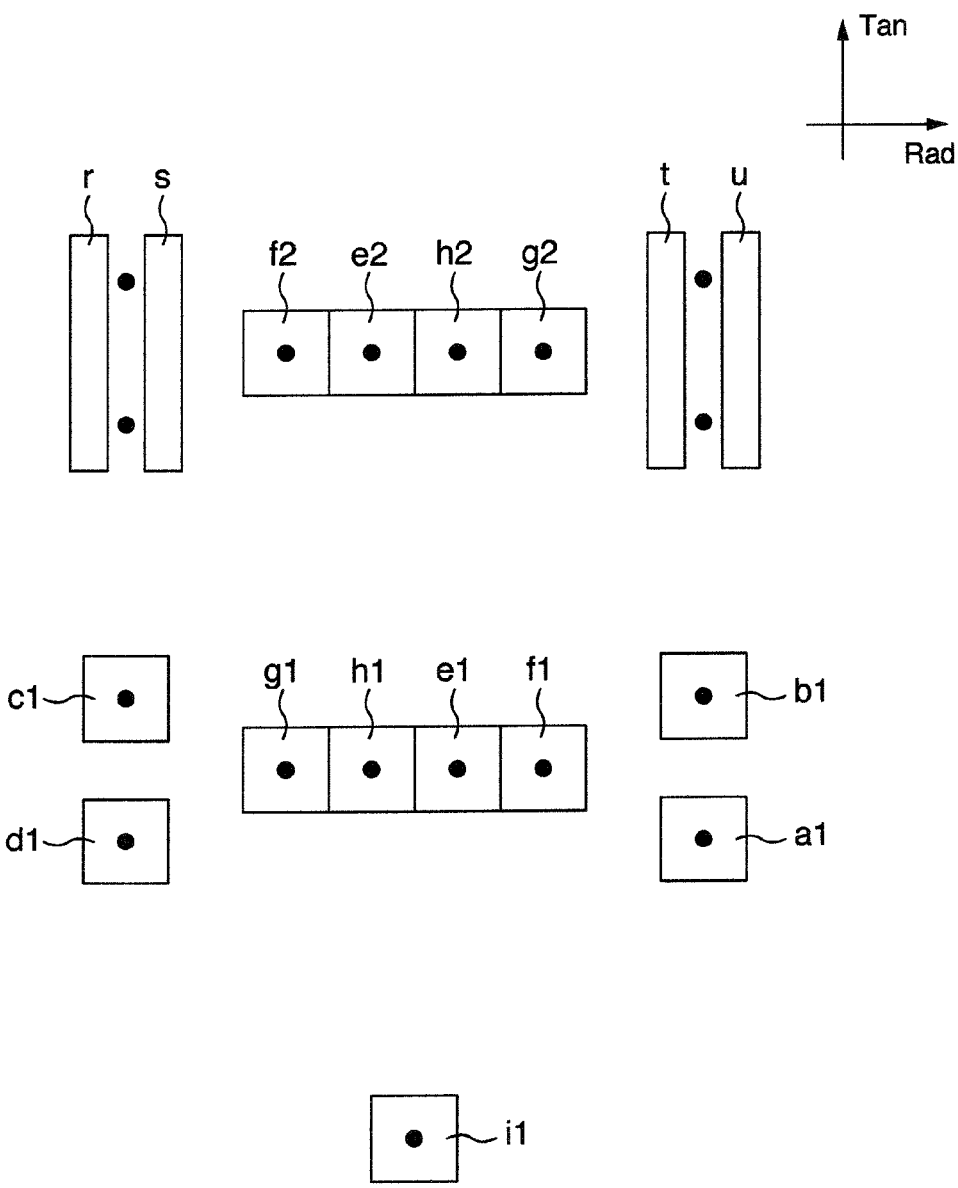
FIG. 10 is a diagram showing a light receiving part according to a second embodiment of the present invention.

FIG. 10 shows a photodetector of an optical system of an optical pickup device according to the second embodiment of the present invention. Different points from the first embodiment reside in that the diffraction direction and the diffraction angle of each area of the diffraction grating 11 are different and the layout of light receiving parts of the photodetector 10 is different, and other structures are similar to those of the first embodiment.

The diffraction grating 11 has a pattern such as shown in FIG. 3. A solid line indicates a border of each area, a two-dot chain line indicates a circumferential shape of an optical flux of the laser beam, and hatched areas indicate a push-pull pattern formed by a track of the optical disc. A spectral ratio of the area of the diffraction grating 11 other than the Di area is, for example, (0-th order light): (+1-st order light): (−1-st order light)=0:7:3, and a spectral ratio of the area Di is, (0-th order light): (+1-st order light): (−1-st order light)=0:1:0. The photodetector 10 has a pattern such as shown in FIG. 10.

In this pattern, +1-st order optical beams diffracted in the areas Da, Db, Dc, Dd, De, Df, Dg, Dh and Di of the diffraction grating 11 become incident upon light receiving parts a1, b1, c1, d1, e1, f1, g1, h1 and i1 of the photodetector shown in FIGS. 4, and −1-st order optical beams become incident upon light receiving parts r, s, t, u, e2, f2, g2 and h2.

Signals A1, B1, C1, D1, E1, F1, G1, H1, I1, R, S, T, U, E2, F2, G2 and H2 obtained from the light receiving parts a1, b1, c1, d1, e1, f1, g1, h1, i1, r, s, t, u, v, e2, f2, g2 and h2 are calculated by the following equations to generate a focusing error signal, a tracking error signal and an RF signal.

$$FES=(R+U)-(S+T)$$

$$TES=[(A1+B1+E1+F1)-(C1+D1+G1+H1)]-kt\times[(E2+F2)-(G2+H2)]$$

$$RF=A1+B1+C1+D1+E1+F1+G1+H1+I1+E2+F2+G2+H2 \qquad \text{Equations 2}$$

Here kt is a coefficient for not making a tracking error signal to generate DC components when the objective lens displaces. Its focusing error detection method is the knife edge method which is publicly known and the description thereof is omitted.

FIGS. 11A and 11B show relationships between signal beams and stray light from other layers during recording/reproducing a dual layer disc. FIG. 11A shows recording/reproducing of layer 0, and FIG. 11B shows recording/reproducing of a layer 1. For optical beams other than an optical beam diffracted in the Di area of the diffraction grating 11, it can be understood that the signal beams and stray light from another layer are not superposed on the light receiving part. A signal I1 detected at the light receiving part i1 is not used for detecting a tracking error signal, and is used only for detecting a reproduction signal. Therefore, even if there is stray light, there is no practical problem.

As described in the first embodiment, since it is desired to align optical beams diffracted in the diffraction grating areas Da, Db, Dc and Dd in the Tan direction, the light receiving parts a1, b1, c1 and d1 are aligned in the Tan direction in a straight line. Further, the light receiving parts e1, f1, g1, h1 and the light receiving parts e2, f2, g2 and h2 are disposed in the Rad direction. Thus, the displacement allowance amount of the objective lens is increased by disposing the light receiving parts different for each area of the diffraction grating. Furthermore, with this layout, the photodetector can be made compact.

As described above, by making the photodetector 10 to have the pattern such as shown in FIG. 10, it becomes possible to separate effectively the signal beam and stray light. Although the light receiving parts el, f1, g1 and h1 and the light receiving parts e2, f2, g2 and h2 are disposed in the Rad direction in a straight line, it is needless to say that similar effects can be obtained even if the light receiving parts a1, b1, c1 and d1 are disposed in the Tan direction and the light receiving parts e1, h1, e2 and h2 are disposed in the Rad direction. The diffraction grating may have the patterns such as shown in FIGS. 9A and 9B. Further in this embodiment, although the diffraction grating is disposed such that transmission through the beam splitter occurs before, it may be disposed such that transmission through the beam splitter occurs after, by using a polarized diffraction grating as the diffraction grating 11. Although a dual layer optical disc is used in the description, an optical disc having more layers may also be used.

[Third Embodiment]

FIG. 13 shows a photodetector of an optical system of an optical pickup device according to the third embodiment of the present invention. A different point from the first embodiment resides in that the distance between the objective lens and diffraction grating 11 shown in FIG. 2 is made longer, and other structures are similar to those of the first embodiment. As the distance between the objective lens and diffraction grating 11 becomes long, the influence of stray light changes with a recording/reproducing layer. This is because stray light becomes convergence light during L0 recording/reproducing and becomes divergence light during L1 recording/reproducing so that a large change in the beam diameter of stray light on the diffraction grating 11 becomes effective.

Figure 14A:
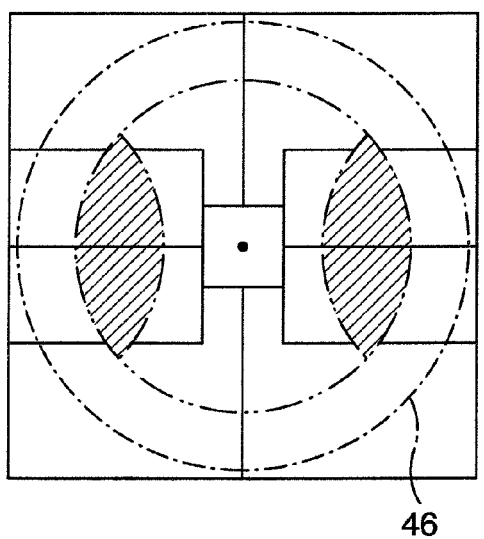
FIGS. 14A and 14B are diagrams showing the shapes of stray light according to the third embodiment.
Figure 14B:
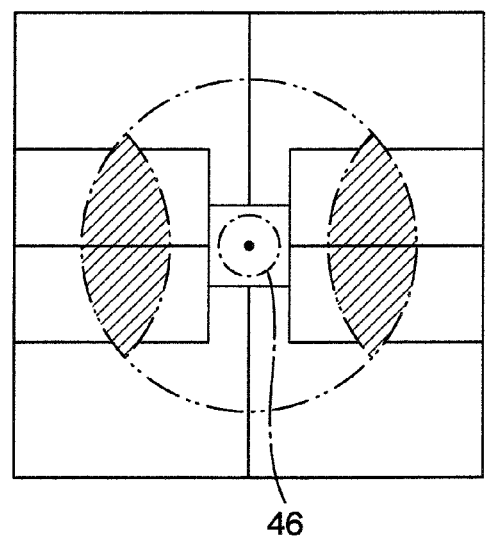

For example, it is assumed that the beam diameters of the signal beam and stray light on the diffraction grating 11 are such as shown in FIGS. 14A and 14B. FIG. 14A shows a state during L0 recording/reproducing, and FIG. 14B shows a state during L1 recording/reproducing. In FIGS. 14A and 14B, a signal beam is indicated by a two-dot chain line, and stray light is indicated by a one-dot chain line 46. For optical beams other than an optical beam diffracted in the Di area of the diffraction grating 11, it can be understood that the signal beam and stray light from another layer are not superposed on the light receiving part. A signal I1 detected at the light receiving part i1 is not used for detecting a tracking error signal, and is used only for detecting a reproduction signal. Therefore, even if there is stray light, there is no practical problem.

Also with this structure, it is possible to separate stray light and make compact the photodetector, by aligning the light receiving parts a1, b1, c1 and d1 in the Tan direction in a straight line, and the light receiving parts e1, f1, g1, h1 and e2, f2, g2, h2 in the Rad direction in a straight line, as shown in FIG. 13.

As described above, even if the distance between the objective lens and diffraction grating 11 becomes long, it becomes possible to separate effectively the signal beam and stray light, by making the photodetector 10 have the pattern such as shown in FIG. 10. The signals can be detected through calculations similar to the first embodiment. The diffraction grating 11 may have the patterns such as shown in FIGS. 9A and 9B. Further in this embodiment, although the diffraction grating is disposed such that transmission through the beam splitter occurs before, it may be disposed such that transmission through the beam splitter occurs after, by using a polarized diffraction grating as the diffraction grating 11. Although a dual layer optical disc is used in the description, an optical disc having more layers may also be used.

[Fourth Embodiment]

Figure 16:
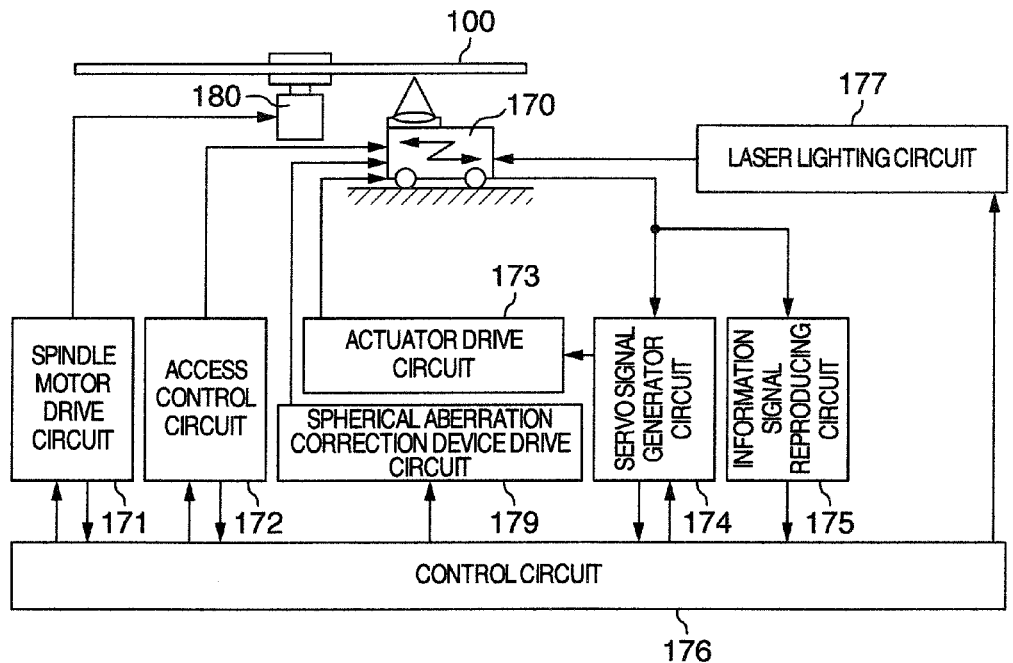
FIG. 16 is a diagram illustrating an optical reproducing apparatus according to a fourth embodiment.

In the fourth embodiment, description will be made on an optical reproducing apparatus mounting the optical pickup device 1. FIG. 16 shows a schematic structure of the optical reproducing apparatus. The optical pickup device 1 has a mechanism capable of driving an optical disc 100 along the Rad direction, the position of the mechanism being controlled in accordance with an access control signal from an access control circuit 172.

A laser lighting circuit 177 supplies a predetermined laser diode drive current to a semiconductor laser diode in the optical pickup device 1, and the semiconductor laser diode emits a laser beam having a predetermined light amount corresponding to reproduction. The laser lighting circuit 177 may be assembled in the optical pickup device 1.

A signal output from a photodetector 10 in the optical pickup device 1 is sent to a servo signal generator circuit 174 and an information signal reproducing circuit 175. The serve signal generator circuit 174 generates servo signals such as a focusing error signal, a tracking error signal and a tilt control signal in accordance with signals from the photodetector 10. In accordance with the servo signals, an actuator in the optical pickup device 1 is driven via an actuator drive circuit 173 to control the position of an objective lens.

The information signal reproducing circuit 175 reproduces an information signal recorded in the optical disc 100, in accordance with signals from the photodetector 10.

Some of signals obtained by the servo signal generator circuit 174 and information signal reproducing circuit 175 are sent to a control circuit 176. Connected to the control circuit 176 are a spindle motor drive circuit 171, the access control circuit 172, the servo signal generator circuit 174, the laser lighting circuit 177, a spherical aberration correction device drive circuit 179 and the like. The control circuit performs rotation control of a spindle motor 180 for rotating the optical disc 100, control of access direction and access position, servo control of the objective lens, control of emission amount of the semiconductor laser diode in the optical pickup device 1, correction of a spherical aberration caused by a different disc substrate thickness, and other controls.

[Fifth Embodiment]

Figure 17:
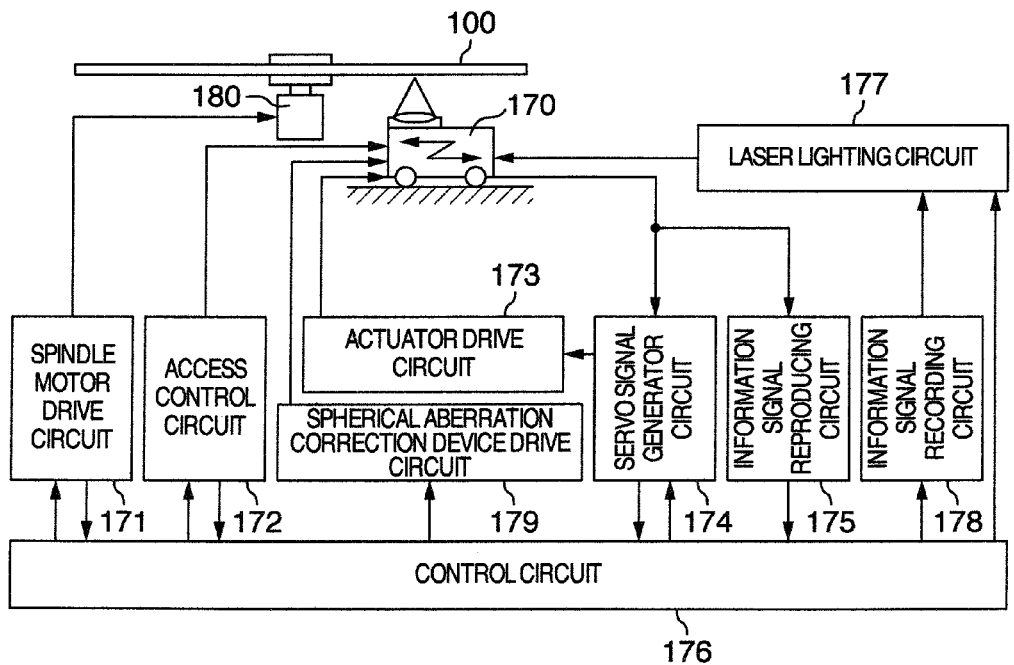
FIG. 17 is a diagram illustrating an optical recording/reproducing apparatus according to a fifth embodiment.

In the fifth embodiment, description will be made on an optical recording/reproducing apparatus mounting the optical pickup device 1. FIG. 17 shows a schematic structure of the optical recording/reproducing apparatus. Different points of this apparatus from the optical recording apparatus described with reference to FIG. 16 reside in the addition of a function of writing desired information in the optical disc 100, by providing an information signal recording circuit 178 between the control circuit 176 and laser lighting circuit 177, and performing lighting control of the laser lighting circuit 177 in accordance with a recording control signal from the information signal recording circuit 178.

Although the embodiments of the optical pickup device and optical information recording/reproducing apparatus of the invention have been described above, the present invention is not limited to the above-described embodiments, but various improvements and modifications are possible in a range not departing from the gist of the present invention.

The invention claimed is:

1. An optical pickup device adapted to interface with a multi-layer optical disc having a plurality of recording layers, comprising:
   a semiconductor laser diode which emits an optical flux;
   an objective lens which converges the optical flux emitted from said semiconductor laser diode and radiates the optical flux to an optical disc;
   an optical branching element which branches an optical flux reflected from said optical disc; and
   a photodetector which receives an optical flux branched by said optical branching element and has a plurality of light receiving parts,
   wherein:
   said optical branching element has three areas A, B and C;
   said area C includes a center of said optical branching element;
   said area A is spaced in a track direction of the optical disc relative to said area C;
   said area B is spaced in a radial direction of the optical disc relative to said area C;
   said photodetector detects a reproduction signal from optical fluxes diffracted in said areas A, B and C;
   said plurality of light receiving parts which detect the beam diffracted in said area A of said optical branching element are disposed separated from light receiving planes which receive diffracted beams from other areas and aligned in a direction substantially perpendicular to a direction corresponding to the track of said optical disc.

2. The optical pickup device according to claim 1, wherein four light receiving parts are used for detecting the beam diffracted in said area A of said optical branching element.

3. The optical pickup device according to claim 1, wherein four light receiving parts are used for detecting the beam diffracted in said area B of said optical branching element.

4. The optical pickup device according to claim 1, wherein:
a focusing error signal is detected from the beam diffracted in said areas B of said optical branching element;
a tracking error signal is detected from the beam diffracted in said areas A and B of said optical branching element;
an offset correction signal of the tracking error signal is detected from the beam diffracted in said area A of said optical branching element; and
a reproduction signal is detected from a sum of beam diffracted in said areas A, B and C.

5. The optical pickup device according to claim 1, wherein:
said area A of said optical branching element is line symmetric relative to a center axis passing a center of said area C and line symmetric relative to an axis in a direction perpendicular to said center axis; and
said area B of said optical branching element is line symmetric relative to said center axis and line symmetric relative to an axis in a direction perpendicular to said center axis.

6. The optical pickup device according to claim 1, wherein one light receiving part is used for detecting the beam diffracted in said area C of said optical branching element.

7. An optical pickup device comprising:
a semiconductor laser diode which emits an optical flux;
an objective lens which converges the optical flux emitted from said semiconductor laser diode and radiates the optical flux to an optical disc;
am optical branching element which branches an optical flux reflected from said optical disc; and
a photodetector which receives an optical flux branched by said optical branching element and has a plurality of light receiving parts,
wherein:
said optical branching element has three areas A, B and C;
said area C includes a center of said optical branching element;
said area A is spaced in a track direction of the optical disc relative to said area C;
said area B is spaced in a radial direction of the optical disc relative to said area C;
said photodetector detects a reproduction signal from optical fluxes diffracted in said areas A, B and C;
said plurality of light receiving parts which detect the beam diffracted in said area A of said optical branching element are aligned in a direction substantially perpendicular to a direction corresponding to the track of said optical disc; and
said plurality of light receiving parts which detect the beam diffracted in said area B of said optical branching element are aligned in a direction substantially parallel to a direction corresponding to the track of said optical disc.

8. The optical pickup device according to claim 1, wherein four light receiving parts are used for detecting the beam diffracted in said area A of said optical branching element.

9. The optical pickup device according to claim 1, wherein four light receiving parts are used for detecting the beam diffracted in said area B of said optical branching element.

10. The optical pickup device according to claim 1, wherein:
a focusing error signal is detected from the beam diffracted in said area B of said optical branching element;
a tracking error signal is detected from the beams diffracted in said areas A and B of said optical branching element;
an offset correction signal of the tracking error signal is detected from the beams diffracted in said area A of said optical branching element; and
a reproduction signal is detected from a sum of beams diffracted in said areas A, B and C.

11. The optical pickup device according to claim 1, wherein:
said area A of said optical branching element is line symmetric relative to a center axis passing a center of said area C and line symmetric relative to an axis in a direction perpendicular to said center axis; and
said area B of said optical branching element is line symmetric relative to said center axis and line symmetric relative to an axis in a direction perpendicular to said center axis.

12. The optical pickup device according to claim 1, wherein one light receiving part is used for detecting the beam diffracted in said area C of said optical branching element.

13. An optical disc apparatus comprising:
an optical pickup device including:
a semiconductor laser diode which emits an optical flux;
an objective lens which converges the optical flux emitted from said semiconductor laser diode and radiates the optical flux to an optical disc;
an optical branching element which branches an optical flux reflected from said optical disc; and
a photodetector which receives an optical flux branched by said optical branching element and has a plurality of light receiving parts,
wherein:
said optical branching element has three areas A, B and C;
said area C includes a center of said optical branching element;
said area A is spaced in a track direction of the optical disc relative to said area C;
said area B is spaced in a radial direction of the optical disc relative to said area C;
said photodetector detects a reproduction signal from optical fluxes diffracted in said areas A, B and C;
said plurality of light receiving parts which detect the beam diffracted in said area A of said optical branching element are aligned in a direction substantially perpendicular to or substantially parallel to a direction corresponding to the track of said optical disc;
a laser lighting circuit which drives said semiconductor laser diode in said optical pickup device;
a servo signal generator circuit which generates a focusing error signal and a tracking error signal by using signals detected by said photodetector of said optical pickup device; and
an information signal reproducing circuit which reproduces an information signal recorded in said optical disc.

14. An optical disc apparatus comprising:
an optical pickup device including:
a semiconductor laser diode which emits an optical flux;
an objective lens which converges the optical flux emitted from said semiconductor laser diode and radiates the optical flux to an optical disc;
an optical branching element which branches an optical flux reflected from said optical disc; and
a photodetector which receives an optical flux branched by said optical branching element and has a plurality of light receiving parts,
wherein:
said optical branching element has three areas A, B and C;
said area C includes a center of said optical branching element;

said area A is spaced in a track direction of the optical disc relative to said area C;

said area B is spaced in a radial direction of the optical disc relative to said area C;

said photodetector detects a reproduction signal from optical fluxes diffracted in said areas A, B and C;

said plurality of light receiving parts which detect the diffracted in said area A of said optical branching element are aligned in a direction substantially perpendicular to a direction corresponding to the track of said optical disc; and said plurality of light receiving parts which detect the beam diffracted in said area B of said optical branching element are disposed in a direction substantially parallel to a direction corresponding to the track of said optical disc;

a laser lighting circuit which drives said semiconductor laser diode in said optical pickup device;

a servo signal generator circuit which generates a focusing error signal and a tracking error signal by using signals detected by said photodetector of said optical pickup device; and an information signal reproducing circuit which reproduces an information signal recorded in said optical disc.

* * * * *